United States Patent Office 3,465,061
Patented Sept. 2, 1969

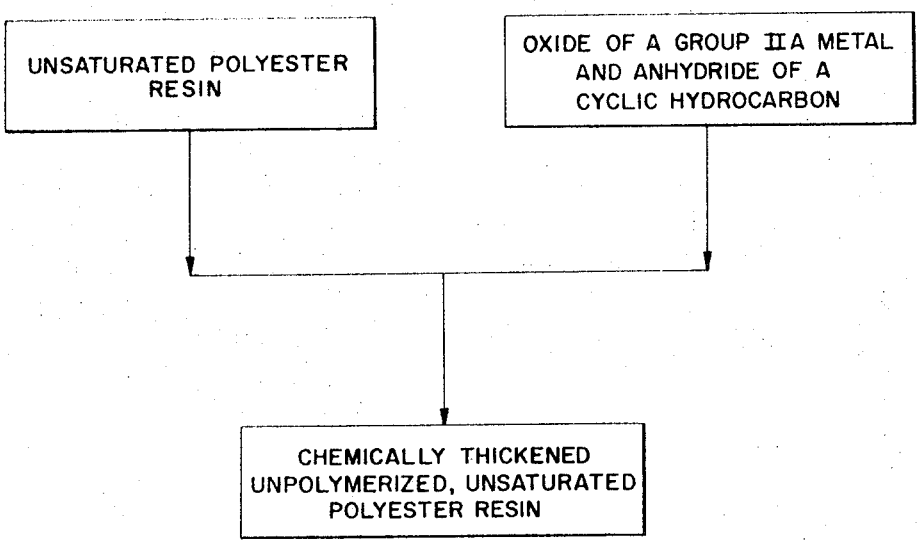

3,465,061
UNSATURATED POLYESTER RESIN COMPOSITIONS HAVING A THICKENING AGENT THEREIN
Frank Fekete and Melvin E. Baum, Monroeville, Pa., assignors to Koppers Company, Inc., a corporation of Delaware
Filed Nov. 1, 1967, Ser. No. 679,876
Int. Cl. C08f 1/84, 21/02; C08g 1/84
U.S. Cl. 260—865                                   3 Claims

ABSTRACT OF THE DISCLOSURE

The viscosity of unsaturated polyester resins formed by mixing the (1) condensation polymers of: (a) dicarboxylic acids, at least a portion of which contains ethylenic unsaturation, and (b) dihydric alcohols with (2) an ethylenically unsaturated copolymerizable monomer such as styrene may be increased by adding a mixture of an oxide of a Group II-A metal and an anhydride of a cyclic hydrocarbon which can be either saturated or unsaturated.

BACKGROUND OF THE INVENTION

Cured unsaturated polyester resins which have been reinforced by fibrous material such as glass fiber mats or the like have excellent physical strength characteristics. However, the formation of shaped objects with such materials has presented problems because the fibers initially immersed within the uncured liquid resin tend to rise to the surface causing the object after curing of the resin to have irregularities in the surface.

To avoid this problem, preforms have been made by spraying glass fibers onto screens similar in shape to the final desired product. Air is sucked through the screen to hold the fibers in place. A binder is then sprayed over the fibers and cured to hold the fibers together in the desired form. The form is then placed into a mold and the unsaturated polyester resin is poured into the mold and cured therein. The resin must be viscous enough to adhere to the form, yet not so viscous to prevent proper wetting of the fibers.

To overcome the foregoing cumbersome and critical process, it has been proposed to coat the glass fibers with the uncured, unsaturated polyester resin liquid to thoroughly wet the fibers. The liquid resin is then thickened, without actually curing the resin, by chemical or physical means. The physical means include: (1) driving off the volatile solvent in which a viscous polyester resin has been dissolved, or (2) using a heated viscous polyester resin then cooling the coated fiber after application. The chemical means include: (1) the addition of a thickening agent such as MgO to the polyester resin, or (2) the partial copolymerization or curing of the resin to a gelled or B-stage. Fibrous reinforcements can thus be pre-coated with a low viscosity thickenable polyester resin which will, therefore, properly wet the fibers, yet the polyester resin coatings will rapidly lose its tacky state by the increase in viscosity enhancing the storability of the pre-coated fibers. Thus, the use of preforms is eliminated as well as the attendent mess of coating the irregular-shaped preform with a liquid resin. Glass fiber mats with such resins may be easily handled and charged to molding machines. More positive control of the amount of charge as well as the shape of the charge can thus be maintained resulting in higher quality molded products as well as economic savings.

However, such systems each have certain economic drawbacks. The solvent system, of course, results in loss of the solvent plus disposal of the fumes. Heating viscous polyesters to reduce their viscosity is costly and cumbersome. Chemical thickening the polyester resin such as by the addition of MgO or $Mg(OH)_2$ as shown in U.S. Patent 2,568,331, issued to Vincent Frilette results in an eventual viscosity build-up; however, one difficulty encountered is the low overall build-up of viscosity of the resin unless large amounts (4% or more) are used which, in turn, can have deleterious effects upon the physical properties of the cured resin. On the other hand, resins modified to rapidly cure to the B-stage have a tendency to continue to cure or harden beyond the B-stage within a short period of time. The B-stage actually represents an intermediate stage of the vinyl copolymerization or curing of the resin.

SUMMARY OF THE INVENTION

Quite surprisingly, we have discovered a system for chemically thickening an unsaturated polyester resin without initiating the vinyl copolymerization or curing of the resin which comprises the addition of a mixture of 0.5–3% of an oxide of a Group II-A metal and 0.5–5% of the anhydride of a cyclic hydrocarbon which can be saturated or unsaturated. High viscosities are thereby attainable without the use of large amounts of metal oxides.

In accordance with the invention, an unsaturated polyester resin composition which increases in viscosity after formation of the composition comprises:

(a) an unsaturated polyester formed by condensing:
   (1) at least one dicarboxylic acid at least a portion of which contains an ethylenic unsaturation with;
   (2) at least one dihydric alcohol;
(b) an $\alpha,\beta$-ethylenically unsaturated copolymerizable monomer; and
(c) a thickening agent to increase the viscosity of the composition which comprises a mixture of 0.5 to 3% by weight of the oxide of a Group II-A metal and 0.5 to 5% by weight of an anhydride of a cyclic hydrocarbon which can be saturated or unsaturated.

DETAILED DESCRIPTION

As previously described in accordance with the invention, an unsaturated polyester resin composition is thickened by the addition of a mixture of an oxide of a Group II-A metal and the anhydride of a cyclic hydrocarbon as illustrated in the drawing. The mixture causes the viscosity of the composition to greatly increase, but does not initiate the vinyl copolymerization of the unsaturated polyester with the ethylenically unsaturated copolymerizable monomer.

The term "unsaturated polyester" as used herein is defined as the condensation polymer produced by condensing approximately equimolar proportions of at least one dicarboxylic acid, at least a portion of which contains ethylenic unsaturation, with at least one dihydric alcohol. The term "unsaturated polyester resin" as used herein is meant to define a combination of a condensation polymer or unsaturated polymer and an ethylenically unsaturated copolymerizable monomer such as styrene, which may be copolymerized with the unsaturated polyester. Before copolymerization, the monomer-polyester mixture may be referred to as an uncured polyester resin and after the copolymerization, as a cured polyester resin.

Unsaturated polyester resins are well known in the art (see for example, U.S. Patent 2,255,313, issued to Carleton Ellis). The unsaturated polyester portion of the resin is a condensation polymer formed by polyesterifying dicarboxylic acids with dihydric alcohols. The dehydrated equivalents of the dicarboxylic acids and dihydric alcohols can be used in such polyesterification reactions such as the anhydrides of the dicarboxylic acids and the oxiranes of the dihydric alcohols whenever these dehydrated forms are capable of existence. To provide unsaturation within the polyester, at least a portion of the dicarboxylic acid or anhydride must contain ethylenic unsaturation. Examples of such unsaturated dicarboxylic acids include maleic, fumaric acid as well as maleic anhydride. The remainder of the dicarboxylic acids are usually either saturated normal aliphatics such as adipic acid, succinic acid or the like, or aromatic diacids such as phthalic acid, isophthalic or the like, as well as their halogenated derivatives such as tetrachlorophthalic anhydride. As stated above, the use of the term "dicarboxylic acid" herein is intended to embrace the anhydride as well whenever the particular dicarboxylic acid has an anhydride equivalent.

Examples of common dihydric alcohols used in the polyesterification are ethylene glycol, 1,2-propane diol, (propylene glycol) and the ether glycols, such as diethylene glycol, dipropylene glycol, or the like. The cyclic glycols such as 1,4-cyclohexane diol or the adducts or reaction products of alkylene oxides with bis-phenol A are also well-known constituents of polyesterification products which may be used in the unsaturated polyester resin of the invention. Also useful are the oxirane equivalents of glycols such as the oxirane equivalent of ethylene glycol (ethylene oxide) or of propylene glycol (propylene oxide) and the like. As stated previously, the use of the term "dihydric alcohols" herein is intended to embrace the oxirane whenever the particular dihydric alcohol has adjacent hydroxyl groups and, therefore, has an oxirane equivalent.

The dicarboxylic acids and dihydric alcohols are reacted together in approximately equimolar proportions to form a polyester. The average molecular weight of the polymer is usually at least 500–1,000 and may be as high as 2,000–4,000.

Unsaturated polyesters are conventionally mixed with an ethylenically unsaturated copolymerizable monomer such as styrene or vinyl toluene. The amount of monomer used generally is about 10–60% and preferably 20–50% by weight of the total polyester resin. Illustrative of such ethylenically unsaturated copolymerizable monomers are styrene, alpha-methyl styrene, chlorostyrene, vinyl toluene, divinyl benzenes, diallyl phthalate, methyl methacrylate and the like. The unsaturated polyester resin is subsequently cured by copolymerization of the unsaturated polyester and the monomer.

Initiation of this copolymerization is usually effected by use of a free radical generating catalyst such as, for example, a peroxide catalyst; although, UV light radiation or the like are also less frequently used. Illustrative of free radical generating catalysts are benzoyl peroxide, methyl ethyl ketone peroxide, cumene peroxide, 2,2'-azobisisobutyronitrile and the like.

In accordance with the invention, the polyester resin is chemically thickened by adding a mixture of an oxide of a Group II–A metal and the anhydride of a cyclic hydrocarbon just prior to use. The metal oxide is used in amounts ranging from 0.5 to about 3% by weight. 2% is the preferred amount. The anhydride is used in amounts ranging from 0.5 to about 5% by weight, preferably about 1–3% by weight. These weight percentages are based on the weight of the polyester resin.

The Group II–A metals whose oxides are useful in the invention are Be, Mg, Ca, Sr, and Ba. These metals are classified according to their appearance in the Periodic Table of the Elements, E. H. Sargent & Co., S–18806, Catalogue No. 113, 1964. The anhydrides of cyclic hydrocarbons have been found to be particularly effective in comparison to either their linear or acidic counterparts. Illustrative of the compounds useful in the invention, there may be mentioned, for example, phthalic anhydride, tetrahydrophthalic anhydride, hexahydrophthalic anhydride and benzoic anhydride. In contrast, for example, to phthalic anhydride, phthalic acid has been found to have rather minimal effect; while, in contrast, to tetrahydrophthalic anhydride, maleic anhydride likewise has little effect. Thus, the compound must contain a cyclic hydrocarbon, either saturated or unsaturated, and must be in the anhydride, not the acidic state. The term "cyclic hydrocarbon" is therefore, intended to define a compound containing one or more rings either saturated or unsaturated containing only carbon-to-carbon bonds in the ring structure.

It should be noted that the chemical thickening which occurs in the invention is not a gelation or B-stage of the resin. Such gelation or B-stage is indicative that the vinyl copolymerization between the unsaturated portion of the condensation polymer and the ethylenically unsaturated monomer. The chemically thickened resin system of the invention remains, for example, completely soluble in acetone until the subsequent high temperature cure. Gelled or B-staged polyester resins are not entirely soluble in acetone which is indicative of the presence of vinyl copolymerization.

The invention will be further understood by referring to the attached flow sheet and the following examples.

Example I

Three percent by weight of a number of unsaturated anhydrides were added respectively to 250-gram samples of a commercially available unsaturated polyester resin Koplac 2000 together with 2% MgO in each case. The polyester resin comprised a phthalic-maleic-propylene glycol polymer condensed in mole ratios of approximately 1:1:2 and dissolved in styrene to a 70% by weight polymer–30% by weight monomer ratio. The unsaturated anhydrides included a linear unsaturated anhydride (maleic anhydride) to illustrate the need for a cyclic hydrocarbon in accordance with the invention. The initial viscosity of the resin before addition of the various additives was 24.7 poises at 77° F. The viscosity of each sample was measured on the first, sixth and fourteenth day and tabulated as follows:

TABLE I

| Additive | Viscosity in poises | | |
| --- | --- | --- | --- |
| | 1 day | 6 days | 14 days |
| Maleic anhydride: | | | |
| 1 | 97 | 352 | 2,010 |
| 3 | 49 | 58 | 80 |
| Benzoic anhydride: | | | |
| 1 | 405 | 64,000 | 233,600 |
| 3 | 440 | 192,000 | 499,200 |
| Tetrahydrophthalic anhydride: | | | |
| 1 | 250 | 28,480 | 400,000 |
| 3 | 520 | 252,800 | 640,000 |
| Phthalic anhydride: | | | |
| 1 | 420 | 74,880 | 640,000 |
| 3 | 425 | 164,800 | 640,000 |
| None | 300 | 14,400 | 136,000 |

The results clearly indicate the difference in viscosity when the anhydride of an unsaturated cyclic hydrocarbon is used in comparison.

Example II

Three percent succinic anhydride and hexahydrophthalic anhydride were respectively added to 250-gram samples of Koplac 2000 together with 2% MgO to illustrate the difference in viscosity obtained when the anhydride of a saturated cyclic hydrocarbon is used in accordance with the invention in contrast to the anhydride of a saturated linear hydrocarbon. The results are tabulated below:

TABLE II
[2% MgO]

| Additive | Viscosity in poises | |
| --- | --- | --- |
| | 1 day | 14 days |
| Hexahydrophthalic anhydride, 3% | 120 | 339,200 |
| Succinic anhydride, 3% | 154 | 288 |

The anhydride of the saturated cyclic hydrocarbon greatly increased the viscosity of the polyester resin, while the anhydride of the saturated linear hydrocarbon was ineffective.

Example III

One percent and three percent phthalic anhydride and phthalic acid were respectively added to 250-gram samples of Koplac 2000 together with 2% MgO to illustrate the difference in viscosity obtained when using the anhydride form in accordance with the invention in contrast to the acidic form. The results are tabulated below:

TABLE III

[2% MgO]

| Additive | Viscosity in poises | | |
|---|---|---|---|
| | 1 day | 6 days | 14 days |
| Phthalic anhydride, 1% | 420 | 74,880 | 640,000 |
| Phthalic anhydride, 3% | 425 | 160,480 | 640,000 |
| Phthalic acid, 1% | 300 | 13,280 | 98,560 |
| Phthalic acid, 3% | 430 | 20,800 | 102,400 |

The above results illustrate the difference obtained when using an anhydride of a cyclic hydrocarbon is used in accordance with the invention in contrast to a corresponding acidic form of the same hydrocarbon. Similar results were obtained by substituting BeO, CaO, SrO, and BaO for MgO in the above example.

Thus, the invention provides a mixture of the oxide of a Group II-A metal and an anhydride of a cyclic hydrocarbon which will greatly increase the viscosity of an unsaturated polester resin without initiating the vinyl copolymerization or curing of the resin. Thus, the storage life of the thickened polyester resin is not altered. The thickened polyester resin can be easily handled thus avoiding messy liquids and resulting waste and economic losses heretofore encountered.

What is claimed:
1. In an unsaturated polyester resin which comprises:
   (1) a condensation polymer which is the reaction product of:
      (a) dicarboxylic acids, at least a portion of which contains ethylenic unsaturation, with
      (b) dihydric alcohols; and
   (2) an alpha-beta-ethylenically unsaturated copolymerizable monomer which is subsequentially copolymeried with said condensation polymer, the improvement which comprises: addition of a mixture of 0.5 to 3% by weight of the oxide of the Group II-A metal and 0.5 to 5% by weight of an anhydride containing a cyclic hydrocarbon to the unsaturated polyester resin to increase the viscosity of the resin before initiation of the copolymerization between the condensation polymer and the ethylenically unsaturated monomer.

2. The improvement of claim 1 wherein said cyclic anhydride is selected from the class consisting of benzoic anhydride, phthalic anhydride, tetrahydrophthalic anhydride, and hexahydrophthalic anydride.

3. The improvement of claim 2 wherein the Group II-A metal is magnesium.

References Cited

UNITED STATES PATENTS 2,628,209  2/1953  Fisk _____ 260—865
3,390,205  6/1968  Schnell et al. _____ 260—863

MURRAY TILLMAN, Primary Examiner

J. T. GOOLKASIAN, Assistant Examiner

U.S. Cl. X.R.

260—863, 40